United States Patent [19]
Halder et al.

[11] Patent Number: 5,845,898
[45] Date of Patent: Dec. 8, 1998

[54] SELF-ADJUSTING BALL-LOCK PIN

[75] Inventors: Werner Halder, Achstetten-Bronnen; Dieter Hummel, Bad Waldsee, both of Germany

[73] Assignee: Erwin Halder KG, Achstetten, Germany

[21] Appl. No.: 912,011

[22] Filed: Aug. 15, 1997

[30] Foreign Application Priority Data

Oct. 23, 1996 [DE] Germany ........................ 196 43 708.3

[51] Int. Cl.$^6$ .................................................... B23Q 3/02
[52] U.S. Cl. ............................................ 269/48.1; 269/49
[58] Field of Search .................................. 269/309, 48.1, 269/49; 279/2.23, 141, 2.12

[56] References Cited

U.S. PATENT DOCUMENTS 5,303,908  4/1994  Halder .

Primary Examiner—Robert C. Watson
Attorney, Agent, or Firm—Herbert Dubno; Andrew Wilford

[57] ABSTRACT

A device for holding together two objects with aligned holes has a body formed with a passage centered on an axis, a tubular bolt axially displaceable in the passage and having a front end projecting from the body and a rear end, and a first spring braced between the bolt and the body for urging the bolt axially rearward relative to the body. A pin axially displaceable in the bolt is formed with a radially outwardly open recess having an angled front flank. At least one retaining element, normally a ball, is radially displaceable in the body front end between a retaining position projecting radially from the bolt and a retracted position recessed in the bolt and engaged in the recess. A second spring urges the pin axially rearward in the bolt and thereby urges the angled flank axially into engagement with the retaining element to press same outward into the retaining position.

8 Claims, 1 Drawing Sheet

F I G. 1
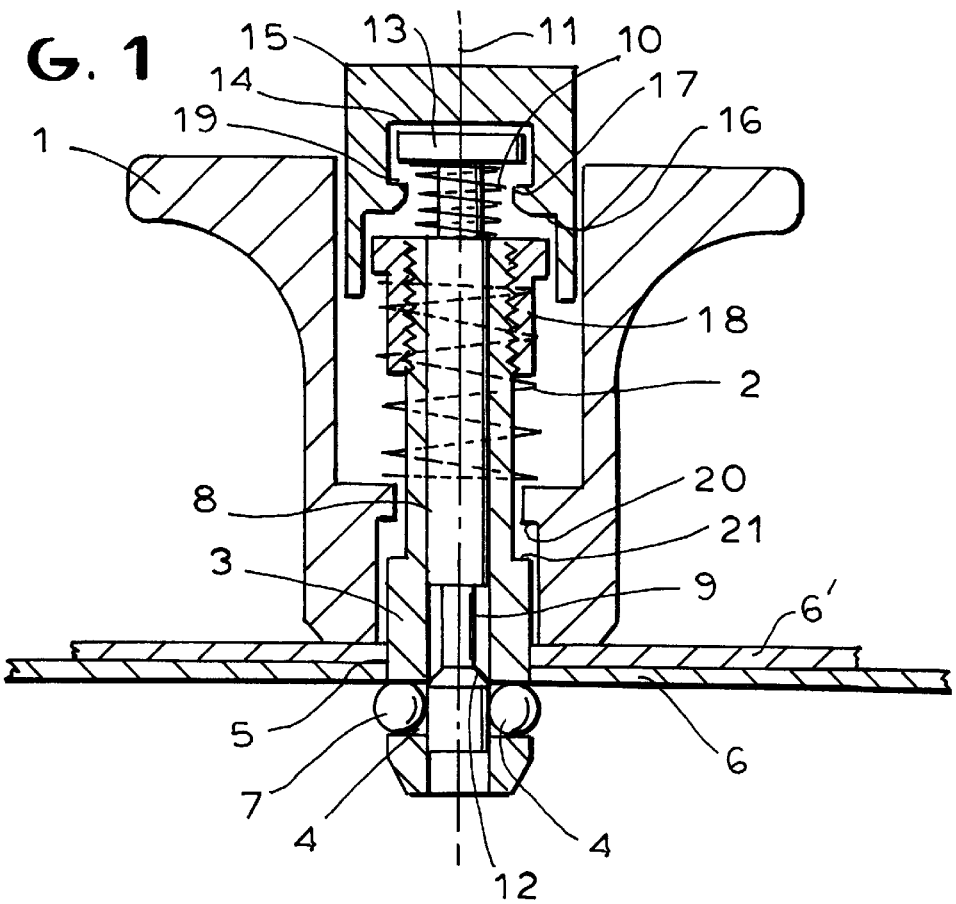
F I G. 2
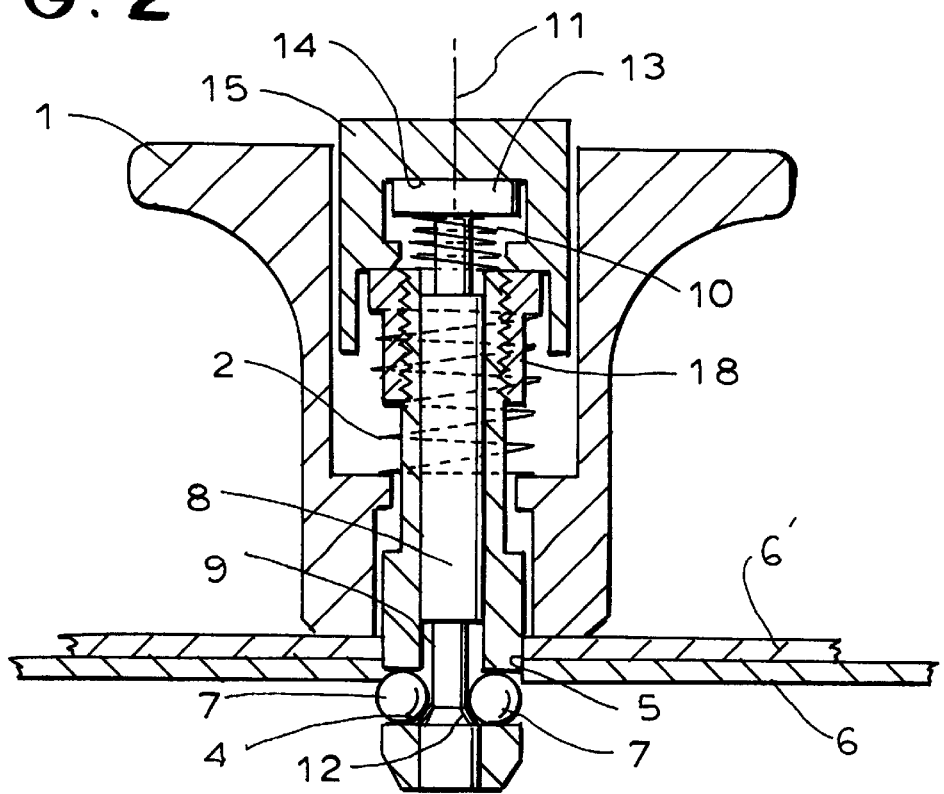

SELF-ADJUSTING BALL-LOCK PIN

FIELD OF THE INVENTION

The present invention relates to a device for releasably securing two objects together. More particularly this invention concerns a ball-lock pin.

BACKGROUND OF THE INVENTION

A ball-lock pin as sold by the Carr Lane Manufacturing Company and as described in commonly owned U.S. Pat. No. 5,303,908 serves to clamp a workpiece formed with a throughgoing hole and having a pair of faces to a support also formed with a throughgoing hole and also having a pair of faces. This device has a tube engaged along an axis through both the holes in a position of the workpiece and support with one face of the workpiece bearing inwardly on one face of the support, the holes aligned, and the other faces of the workpiece and support turned outwardly away from each other. The tube is formed with a radially throughgoing aperture opening outwardly of one of the outer faces and with a screwthread outward of the other outer face. A retaining element is radially displaceable in the aperture between an extended position projecting radially from the tube and engageable axially with the one outer face and a retracted position generally wholly recessed in the tube. An actuating pin axially displaceable in the tube is engageable with the element to radially displace same into its extended position. A nut threaded on the screwthread of the tube has a face bearing axially inward on the other outer face. As described in the cited patent, a formation on the one outer face angularly engages with the element in the extended position immediately adjacent the hole of the support of the element for preventing rotation of the tube in the holes.

In another known system a spring is braced between the tube and the nut so that this nut is pressed by the spring against the outer face of the workpiece. To use the device the user first extends the actuating pin to allow the retaining element to move into the retracted position and then shifts the tube outward and pokes it through the holes in the support and workpiece. These are only secured together when after release of the actuating pin the retaining element is shifted back into the extended position. Up to then the device can be pulled axially out of the holes.

OBJECTS OF THE INVENTION

It is therefore an object of the present invention to provide an improved device for securing together two objects.

Another object is the provision of such an improved device for securing together two objects which overcomes the above-given disadvantages, that is which locks itself automatically as soon as it is fitted through the holes.

SUMMARY OF THE INVENTION

A device for holding together two objects with aligned holes has according to the invention a body formed with a passage centered on an axis, a tubular bolt axially displaceable in the passage and having a front end projecting from the body and a rear end, and a first spring braced between the bolt and the body for urging the bolt axially rearward relative to the body. A pin axially displaceable in the bolt is formed with a radially outwardly open recess having an angled front flank. At least one retaining element, normally a ball, is radially displaceable in the body front end between a retaining position projecting radially from the bolt and a retracted position recessed in the bolt and engaged in the recess. A second spring urges the pin axially rearward in the bolt and thereby urges the angled flank axially into engagement with the retaining element to press same outward into the retaining position.

The ball-lock pin according to the invention has the advantage that the pin can be pushed until the retaining element is adjacent the recess and then the pin stops. Only when the bolt is poked through one or both of the objects, normally plates, is the retaining element pressed in on the angled flank of the recess so that the second spring is tensioned. Immediately after the retaining element clears the objects the spring presses the rod back again and the retaining element can be pushed out of the recess so that the retaining element is only in the recessed position for the short time it takes to poke the bolt through the holes. After pushing the bolt through the objects the retaining element pressed outward with the biasing force of the second spring.

Since it is difficult to position the pin such that the retaining element is positioned immediately adjacent the angled flank, according to the invention a button is axially displaceable in the body at the rear end of the bolt and has an axially forwardly directed abutment surface axially engageable with a rearwardly directed abutment surface of the bolt. The surfaces are spaced in the retaining position of the element by a distance generally equal to a distance between the element and the front flank. In this manner on the initial actuation of the pin the retaining element is moved out of its retaining position, in which it is held and does not engage in the recess, into an intermediate retaining position from which it can be moved into the recessed position. Operation of the ball-lock pin is thus simplified in that it does not require the operator to make precise adjustments in order to position the retaining element adjacent the recess.

In accordance with a further feature of the invention the pin has a head received in the button and the button is formed with an abutment ridge limiting axial travel of the head and pin relative to the button. This ensures that on movement of the retaining element into the recessed position, in which its cap engages the bolt, the cap can only be shifted a short fixed distance relative to the head of the pin so that the retaining element is not shifted too far axially into the recess and after engagement of the bolt through the holes it can be moved rapidly into the retaining position. To this end it has proven advantageous when the second spring is braced axially between the pin and the bolt.

The according to the invention angled flank is rounded. In this manner at the start and the end of the travel of the retaining element along this flank it moves on a relatively steep surface so that at the start of travel from the intermediate retaining to the recessed position a relatively large force is necessary to prevent an unintentional actuation.

In order to prevent a tipping of the bolt in the holes of the objects it is preferred according to the invention to use two such retaining elements radially displaceable in the body front end. These elements are typically balls. Normally according to the invention the first spring is stiffer than the second spring.

BRIEF DESCRIPTION OF THE DRAWING

The above and other objects, features, and advantages will become more readily apparent from the following description, reference being made to the accompanying drawing in which:

FIG. 1 is an axial section through the lock pin in the fully locked position; and FIG. 2 is a view like FIG. 1 but showing the lock pin as it is being installed.

SPECIFIC DESCRIPTION

As seen in the FIGS. 1 and 2, a ball-lock pin according to the invention has a body or nut 1 centered on an axis 11 and provided with a coaxial tubular bolt 3 urged axially backward by a spring 2 braced axially forward against the body 1 and axially backward against a T-nut 18 threaded to a rear end of the bolt 3. The front end of the bolt is formed with a pair of radially outwardly open passages 4 with restricted outer ends and holding respective retaining elements 7 here constituted as steel balls. This device serves to secure together two objects, here plates 6 and 6' formed with aligned holes 5.

An actuating or pusher pin 8 is coaxially slidable inside the tubular bolt 3 and has a front end formed with a radially outwardly open groove 9. The radial depth of the groove 9, the depth of the passages 4, and the diameters of the balls 7 are such that when the balls 7 are engaged in the groove 4 they are recessed in and do not project radially past an outer surface of the bolt 3, but otherwise they do project therepast.

The rear end of the pin 8 is formed with an enlarged head 13 received in a seat 14 of an actuating button 15 axially displaceable in the rear end of the nut body 1. A second spring 10 is braced axially between the head 13 and the rear end of the bolt 3 to pull the pin 8 back into the illustrated position with the balls 7 extending from the bolt 3. The button 15 is formed with an inwardly directed ridge 17 forming a rearwardly directed abutment surface 19 and a forwardly directed abutment surface 16. The surface 16 is axially forwardly engageable with the rear end of the bolt 3, actually with the nut 18 fixed thereon.

The groove 9 has a rounded and angled front flank 12 over which the balls 7 ride as they move between the outer retaining position and the inner retracted position. In addition the spring 2 is stiffer then the spring 10. An axially forwardly directed abutment surface 20 on the nut and an axially backwardly directed abutment surface 21 on the bolt 3 are engageable with each other in an axial rearmost position of the bolt 3 in the nut 1.

When the bolt 3 is poked through the bores 5 of the plates 6 and 6' the retaining element 7 is pushed by the edges of the bores 5 into the groove 9 so that the pin 8 is drawn against the force of the second spring 10 further outward. After the balls 7 pass through the holes 5 the pin 8 is moved by the force of the second spring 10 again into its starting position with the balls 7 riding outward on the flank 12 into the outer retaining position. In the retaining position of the balls 7 the distance of the surface 16 from the bolt 3 corresponds to the distance of the balls 7 from the angled flank 12 so that on actuation of the pin 8 the balls 7 are positioned on the edge of the groove 9 at the start of the angled flank 12.

Thus to clamp two plates 6 and 6' together with the ball-lock pin of this invention the user pushes the button 15 axially forward (down in the drawing) sufficiently to extend the bolt 3 far enough that the balls 7 are spaced from the front end of the nut 1 by a distance greater than the thickness of the two plates 6 and 6'. Such depression of the button 15 first compresses the relatively soft spring 10 so that the pin 8 is moved axially forward to position the balls 7 not on the cylindrical outer surface of the pin 8, but on the angled flank 12 as shown in FIG. 2. As the bolt 3 is then forced through the holes 5, the edges of these holes 5 will push the balls 7 radially in, shifting the pin 8 somewhat forward and loading the spring 2. As soon as the bolt 3 is poked through the holes 5 enough that the balls 7 are clear of the plates 6 and 6', however, the spring 11 will shift the pin 8 back and push them radially outward. Subsequent releasing of the button 15 will allow the spring 2 to shift the bolt 2 back and the spring 10 to shift the pin 8 back, locking up the assembly into the position of the drawing.

We claim:

1. A device for holding together two objects with aligned holes, the device comprising:
    a body formed with a passage centered on an axis;
    a tubular bolt axially displaceable in the passage and having a front end projecting from the body and a rear end;
    a first spring braced between the bolt and the body for urging the bolt axially rearward relative to the body;
    a pin axially displaceable in the bolt and formed with a radially outwardly open recess having an angled front flank;
    at least one retaining element radially displaceable in the body front end between a retaining position projecting radially from the bolt and a retracted position recessed in the bolt and engaged in the recess; and
    means including a second spring urging the pin axially rearward in the bolt and thereby urging the angled flank axially into engagement with the retaining element to press same outward into the retaining position.

2. The holding device defined in claim 1, further comprising:
    a button axially displaceable in the body at the rear end of the bolt and having an axially forwardly directed abutment surface axially engageable with a rearwardly directed abutment surface of the bolt, the surfaces being spaced in the retaining position of the element by a distance generally equal to a distance between the element and the front flank.

3. The holding device defined in claim 2 wherein the pin has a head received in the button and the button is formed with an abutment ridge limiting axial travel of the head and pin relative to the button.

4. The holding device defined in claim 1 wherein the second spring is braced axially between the pin and the bolt.

5. The holding device defined in claim 1 wherein the angled flank is rounded.

6. The holding device defined in claim 1 wherein there are two such retaining elements radially displaceable in the body front end.

7. The holding device defined in claim 1 wherein the retaining element is a ball.

8. The holding device defined in claim 1 wherein the first spring is stiffer than the second spring.

* * * * *